(12) United States Patent
Lykowski

(10) Patent No.: US 11,552,456 B1
(45) Date of Patent: Jan. 10, 2023

(54) PRE-CHAMBER SPARK PLUG

(71) Applicant: FEDERAL-MOGUL IGNITION LLC, Southfield, MI (US)

(72) Inventor: James D. Lykowski, Temperance, MI (US)

(73) Assignee: FEDERAL-MOGUL IGNITION LLC, Southfield, MI (US)

( * ) Notice: Subject to any disclaimer, the term of this patent is extended or adjusted under 35 U.S.C. 154(b) by 0 days.

(21) Appl. No.: 17/572,130

(22) Filed: Jan. 10, 2022

(51) Int. Cl.
| | |
|---|---|
| *H01T 13/06* | (2006.01) |
| *F02B 19/12* | (2006.01) |
| *H01T 13/08* | (2006.01) |
| *H01T 13/54* | (2006.01) |
| *F02B 19/10* | (2006.01) |

(52) U.S. Cl.
CPC .............. *H01T 13/06* (2013.01); *F02B 19/12* (2013.01); *H01T 13/08* (2013.01); *H01T 13/54* (2013.01); *F02B 19/1019* (2013.01)

(58) Field of Classification Search
CPC ......... H01T 13/06; H01T 13/08; H01T 13/54; F02B 19/00; F02B 19/08; F02B 19/1019–1061; F02B 19/12
See application file for complete search history.

(56) References Cited

U.S. PATENT DOCUMENTS

| | | | |
|---|---|---|---|
| 1,870,981 A | 8/1932 | Auzin | |
| 2,153,598 A | 4/1939 | Steward | |
| 4,028,576 A | 6/1977 | Wofsey | |
| 4,509,476 A | 4/1985 | Breuser | |
| 6,597,088 B1 | 7/2003 | Glaser et al. | |
| 9,316,144 B2 | 4/2016 | Gruber | |
| 10,109,986 B2 | 10/2018 | Niessner | |
| 10,658,818 B2 | 5/2020 | Niessner | |
| 10,833,485 B2 | 11/2020 | Niessner | |
| 11,183,818 B2 | 11/2021 | Niessner | |
| 2013/0214672 A1 | 8/2013 | Rohrbach et al. | |
| 2015/0028737 A1* | 1/2015 | Alfonso | H01T 13/54 313/125 |
| 2018/0123323 A1 | 5/2018 | Kobayashi et al. | |

(Continued)

FOREIGN PATENT DOCUMENTS

| | | |
|---|---|---|
| AT | 14789 U1 | 6/2016 |
| AT | 14789 U1 | 6/2016 |

(Continued)

*Primary Examiner* — Mariceli Santiago
(74) *Attorney, Agent, or Firm* — Reising Ethington, P.C.

(57) ABSTRACT

A pre-chamber spark plug includes a shell extending along a longitudinal axis and comprising an inner surface. The pre-chamber spark plug further includes an insulator including an outer surface. The pre-chamber spark plug further includes a pre-chamber cap connected to the shell. The pre-chamber cap and the shell together forms a pre-chamber. The pre-chamber spark plug further includes an annular reservoir defined between the outer surface of the insulator and the inner surface of the shell. The annular reservoir is spaced apart from the pre-chamber with respect to the longitudinal axis. The pre-chamber spark plug further includes a plurality of projections disposed between the annular reservoir and the pre-chamber with respect to the longitudinal axis. The plurality of projections at least partially define a plurality of flow passages therebetween.

16 Claims, 7 Drawing Sheets

(56) References Cited

U.S. PATENT DOCUMENTS

| | | |
|---|---|---|
| 2020/0080466 A1 | 3/2020 | Anderson |
| 2020/0358260 A1 * | 11/2020 | Gozawa ............... H01T 13/06 |
| 2021/0021105 A1 | 1/2021 | Kawata et al. |
| 2021/0203135 A1 | 7/2021 | Shibata et al. |
| 2021/0249846 A1 | 8/2021 | Tanahashi et al. |
| 2022/0120210 A1 | 4/2022 | Puschnik et al. |

FOREIGN PATENT DOCUMENTS

| | | | |
|---|---|---|---|
| AT | 520987 A1 | 9/2019 | |
| AT | 522050 | 8/2020 | |
| AT | 522438 A4 | 11/2020 | |
| AT | 523273 A1 | 7/2021 | |
| DE | 3025896 A1 | 2/1982 | |
| DE | 3230793 A1 | 2/1984 | |
| DE | 102020110960 A1 | 10/2020 | |
| DE | 102020213028 A1 | 4/2021 | |
| DE | 102021109337 A1 | 10/2021 | |
| EP | 1701419 A1 * | 9/2006 | ............. F02P 13/00 |
| GB | 1370762 A | 10/1974 | |
| JP | 2016004730 A | 1/2016 | |
| WO | WO-0150017 A1 * | 7/2001 | ............. F02F 1/242 |
| WO | 2014191085 A1 | 12/2014 | |

\* cited by examiner

SECTION A-A'

SECTION B-B'

PRE-CHAMBER SPARK PLUG

TECHNICAL FIELD

The present disclosure generally relates to a pre-chamber spark plug, and in particular to a pre-chamber spark plug for an internal combustion engine.

BACKGROUND

Pre-chamber (i.e., pre-combustion chamber) spark plugs are typically used to enhance the lean flammability limits in lean burn engines. Generally, for a passive pre-chamber spark plug, there is no active component or means to actively introduce or remove fresh air, fuel, or residual gases except a communication with a main combustion chamber via openings of a pre-chamber cap. Further, in the passive pre-chamber spark plug, there is no active mechanism to influence or adjust flow fields of the fresh air and the residual gases in a pre-chamber.

During a compression stroke of an engine, fuel-air mixture must be led into the pre-chamber of the pre-chamber spark plug in such a way that there is an ignitable mixture at a spark gap. Due to subsequent combustion and the pressure increase resulting therefrom, torches escape through the openings of the pre-chamber cap and ignite the fuel-air mixture in the main combustion chamber of the engine. However, in some cases, some of the residual gases in the pre-chamber and between the spark plug electrodes are not completely flushed out and can remain within the pre-chamber during exhaust and intake strokes. A pressure difference between the main combustion chamber and the pre-chamber can increase to force a fresh charge through the openings into the pre-chamber. Pressurizing the fresh charge into the pre-chamber can compress the residual gases towards the spark plug. The residual gases trapped in the pre-chamber can lead to pre-ignition, engine misfire, and/or abnormal combustion, especially when the engine is operating at richer lambda (air/fuel ratio) ranges. In other words, a residual burnt fuel-air mixture can cause self-ignition of fuel-air mixture that enters the pre-chamber during a subsequent engine cycle. In most of the cases, the residual gases are accumulated in the pre-chamber volume and in a gap between an insulator and a metal shell of the pre-chamber spark plug.

Moreover, when the spark plug gets too hot, an uncontrolled ignition can occur in the main combustion chamber prior to an ignition point. This can increase the risk of engine damage. Pre-ignition in the pre-chamber of the spark plug not only increases the temperatures of the various spark plug components such as a ground electrode, a center electrode, an insulator base, or the pre-chamber cap, but can also lead to pre-ignition in the main combustion chamber. One of the ways to prevent self-ignition and/or pre-ignition in the pre-chamber is to increase volume of the pre-chamber. However, volume of the pre-chamber cannot be increased by simply increasing a diameter of the pre-chamber as it is limited by specified engine geometry. Further, increased volume of the pre-chamber can result in an unbalanced ratio of a lower chamber volume (volume of the pre-chamber below the spark gap and towards the combustion chamber) to an upper chamber volume (volume of the pre-chamber above the spark gap) within the pre-chamber spark plug. This can cause a reduced movement of the fresh charge into a spark gap area within the pre-chamber. This can again cause poor combustion in the pre-chamber and a narrow operating range of the engine.

Conventional methods to prevent self-ignition and/or pre-ignition in the pre-chamber include providing a secondary pre-chamber insert in addition to a conventional spark plug. A geometry of the secondary pre-chamber insert is chosen such that an additional upper chamber volume can be externally created and a balanced ratio of the lower chamber volume to the upper chamber volume within the pre-chamber spark plug is achieved. However, introducing the secondary pre-chamber insert can cause space constraints and increase an overall manufacturing cost and complexity of the engine. Another conventional technique to prevent self-ignition and/or pre-ignition in the pre-chamber involves tuning a pre-chamber spark plug to provide optimum combustion performance over a narrow operating range and add a completely separate secondary spark plug within the combustion chamber. The secondary spark plug provides ignition in the combustion chamber when ignition in the pre-chamber spark plug is ineffective. However, introducing the secondary spark plug can again cause space constraints and increase the overall manufacturing cost and complexity of the engine.

SUMMARY

According to an aspect, a pre-chamber spark plug is provided. The pre-chamber spark plug includes a shell extending along a longitudinal axis. The shell includes an inner surface. The pre-chamber spark plug further includes an insulator including an outer surface and disposed at least partially within the shell. The outer surface of the insulator faces the inner surface of the shell. The pre-chamber spark plug further includes a pre-chamber cap connected to the shell. The pre-chamber cap and the shell together forms a pre-chamber. The pre-chamber cap includes one or more openings that permits gas exchange between the pre-chamber and a space outside of the pre-chamber. The pre-chamber spark plug further includes an annular reservoir defined between the outer surface of the insulator and the inner surface of the shell. The annular reservoir is spaced apart from the pre-chamber with respect to the longitudinal axis. The pre-chamber spark plug further includes a plurality of projections angularly separated from each other relative to the longitudinal axis. The plurality of projections are disposed between the annular reservoir and the pre-chamber with respect to the longitudinal axis and at least partially define a plurality of flow passages therebetween. Each flow passage extends at least partially parallel to the longitudinal axis. Each flow passage fluidly extends between the annular reservoir and the pre-chamber, such that the annular reservoir is in fluid communication with the pre-chamber.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

DETAILED DESCRIPTION

Figure 1:
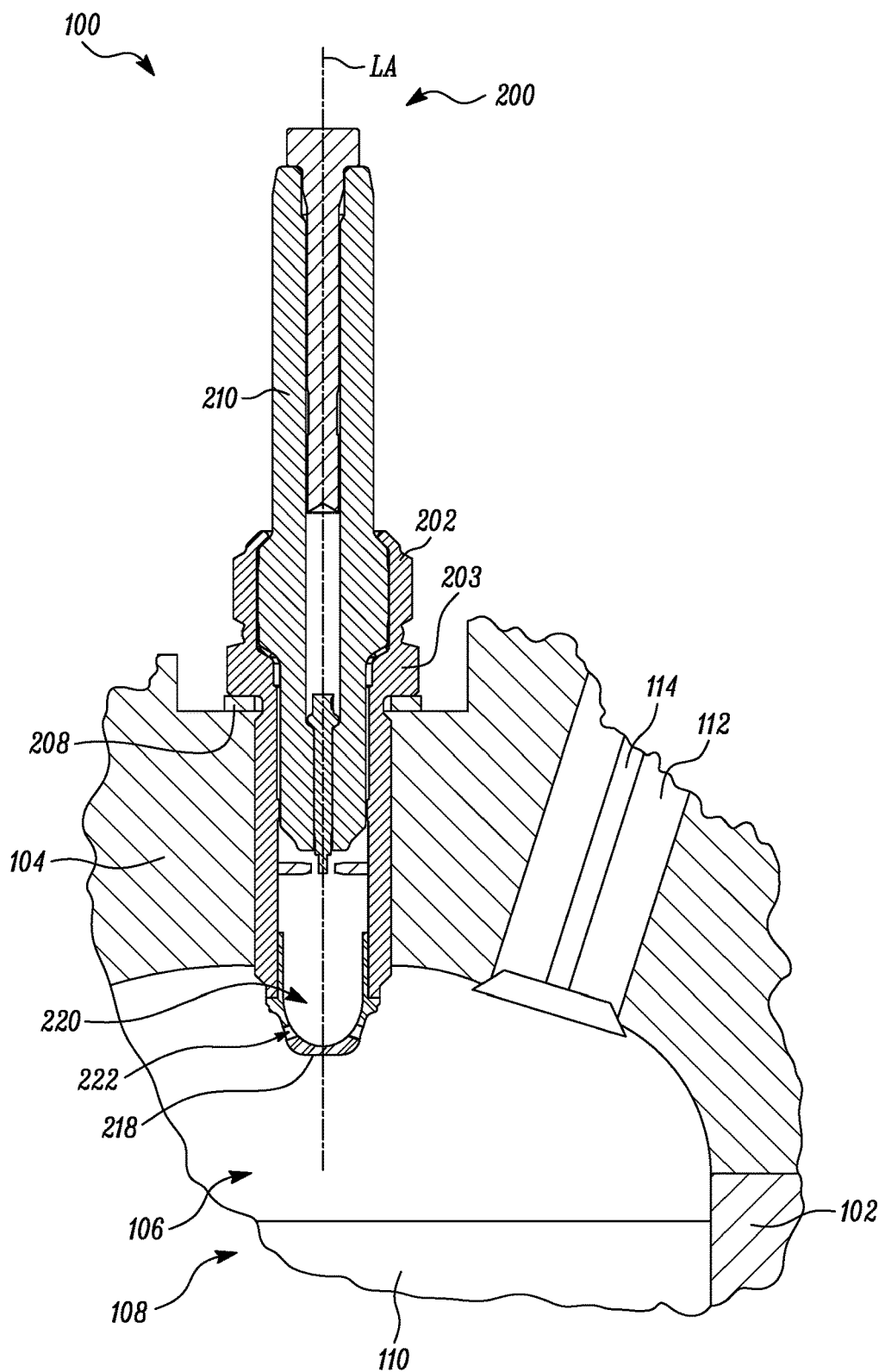
FIG. 1 is a partial cross-sectional view of an internal combustion engine having a pre-chamber spark plug, according to an embodiment of the present disclosure.

The following description is merely exemplary in nature and is in no way intended to limit the invention, its application, or uses. Referring now to the drawings, like reference numerals designate like or corresponding parts throughout the several views. Referring to FIG. 1, a cross-sectional view of an internal combustion engine 100 is illustrated. The internal combustion engine 100 includes an engine block 102 and a cylinder head 104 defining a combustion chamber 106 therein. The internal combustion engine 100 further includes a plurality of cylinders 108, one of which is partially depicted in FIG. 1. The cylinder 108 has a piston 110 that is able to move in the engine block 102. The engine block 102, the cylinder head 104, and the piston 110 delimit the combustion chamber 106 whose volume changes as the piston 110 moves. The piston displacement of the cylinder 108 can lie in the range from 300 cm$^3$ to 500 cm$^3$. The combustion chamber 106 is fed by a conduit 112, which can be an intake duct or an exhaust duct. The conduit 112 can be closed by a valve 114.

The internal combustion engine 100 further includes a pre-chamber spark plug 200 extending at least partially through the cylinder head 104 and received at least partially within the cylinder head 104. The pre-chamber spark plug 200 at least partially extends into the combustion chamber 106 through the cylinder head 104. Generally, the pre-chamber spark plug 200 is screwed with its external threads (not shown) into the cylinder head 104.

Figure 2:
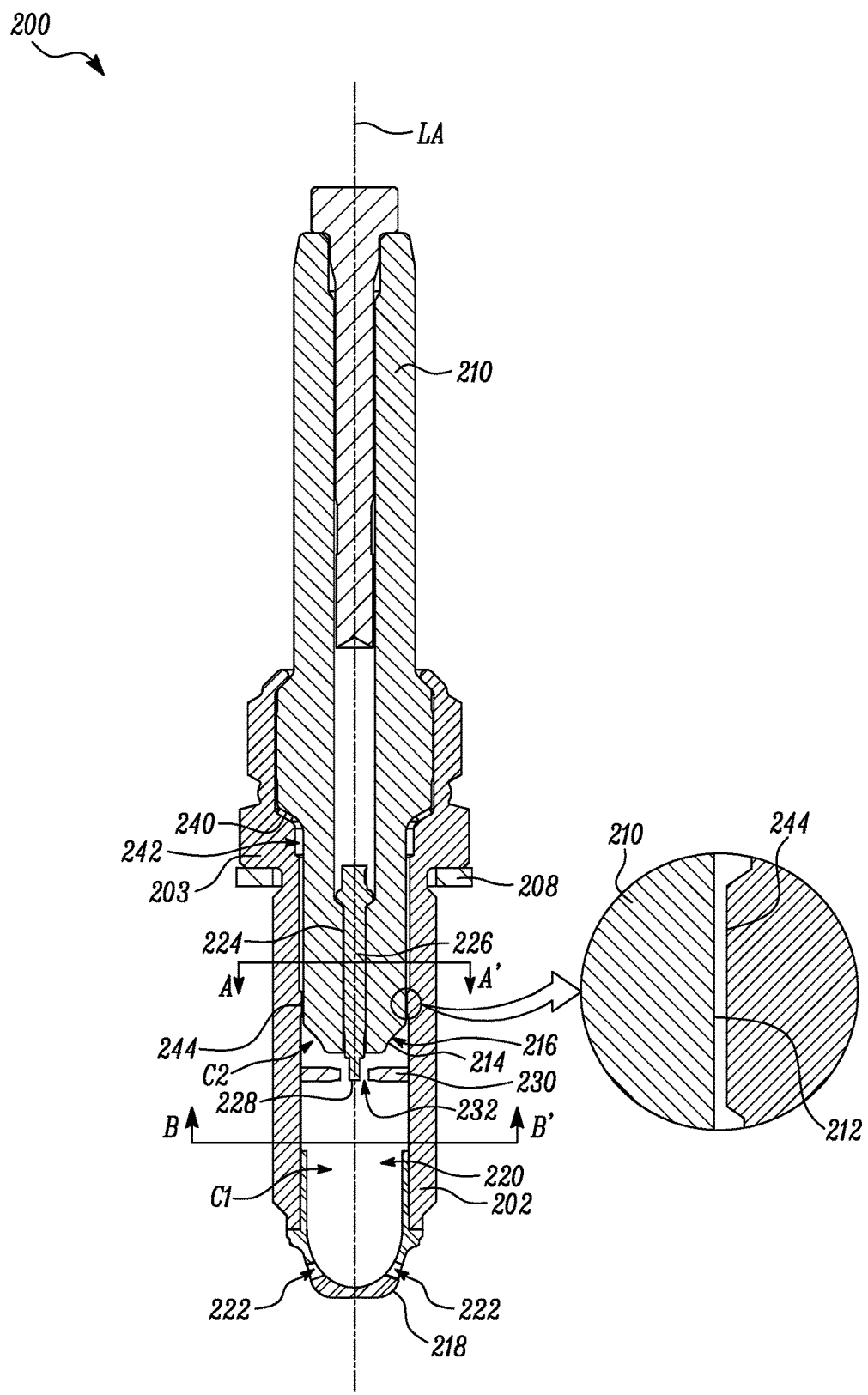
FIG. 2 is a cross-sectional view of the pre-chamber spark plug of FIG. 1, according to an embodiment of the present disclosure.
Figure 3:
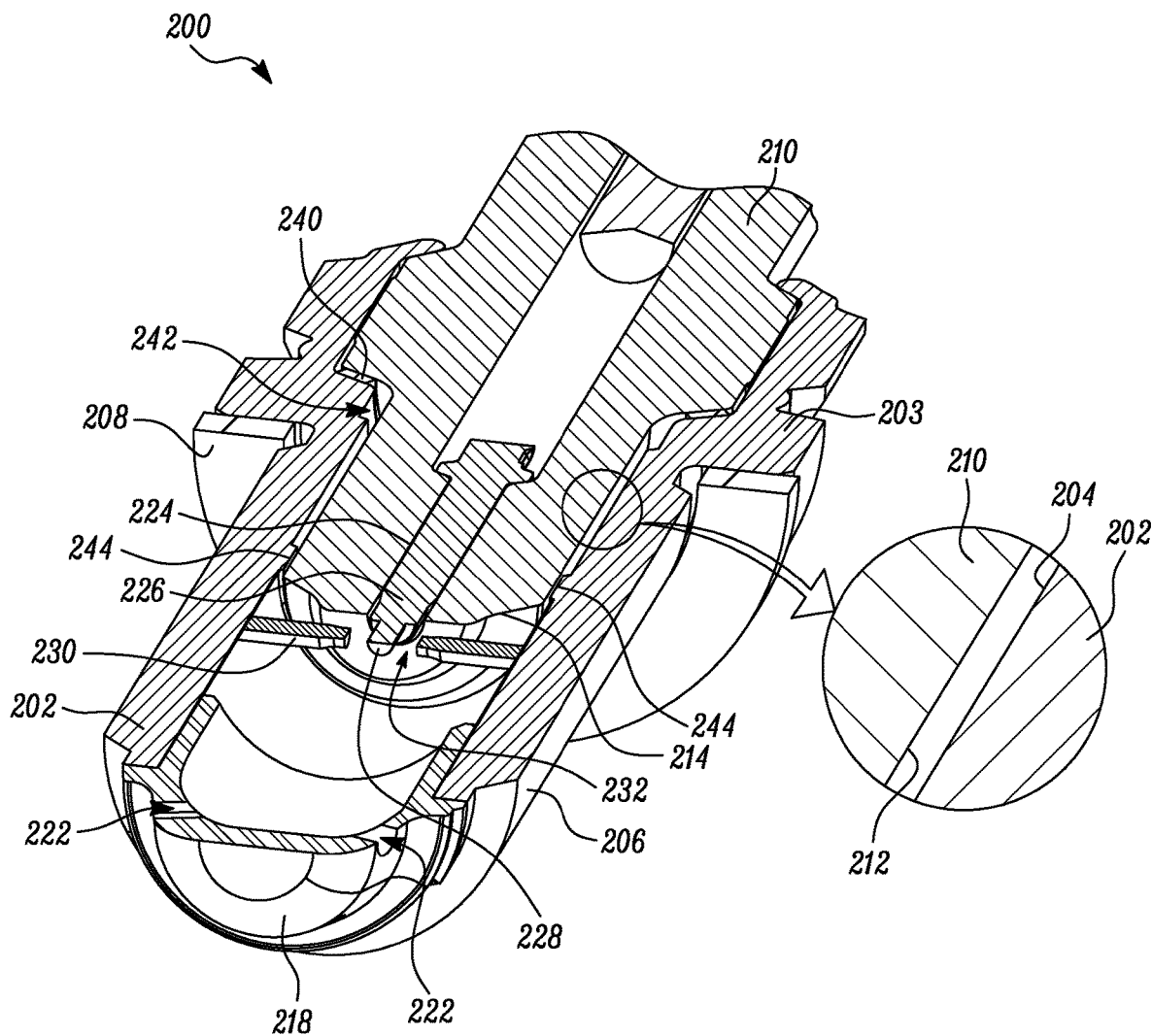
FIG. 3 is a sectional perspective view of the pre-chamber spark plug of FIG. 2.
Figure 4:
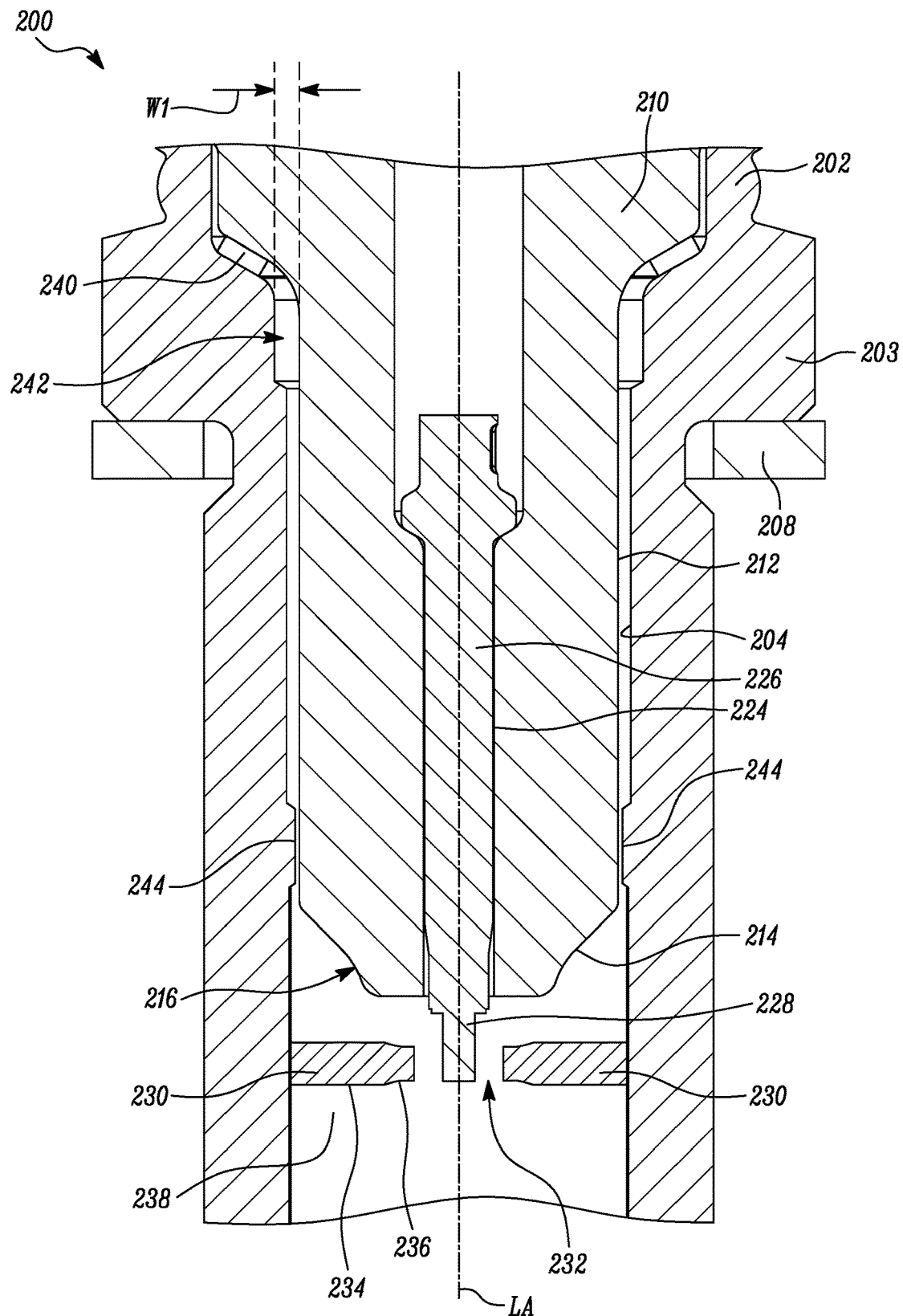
FIG. 4 is an enlarged cross-sectional view of a portion of the pre-chamber spark plug of FIG. 2, according to an embodiment of the present disclosure.

FIG. 2 is a cross-sectional view of the pre-chamber spark plug 200, according to an embodiment of the present disclosure. FIG. 3 is a cross-sectional view of the pre-chamber spark plug 200 from another angle. FIG. 4 is an enlarged view of a portion of the pre-chamber spark plug 200. The pre-chamber spark plug 200 includes a shell 202 extending along a longitudinal axis LA. With reference to FIG. 3, the shell 202 includes an inner surface 204 and an outer surface 206 facing an external environment of the pre-chamber spark plug 200. The shell 202 has a metallic body. The inner surface 204 can correspond to a radially inner surface of the shell 202, while the outer surface 206 can correspond to a radially outer surface of the shell 202.

With reference to FIGS. 2 to 4, the pre-chamber spark plug 200 further includes a plug seat 208 disposed between the shell 202 and the cylinder head 104. The plug seat 208 limits how far the pre-chamber spark plug 200 can be screwed into the internal combustion engine 100. The plug seat 208 is an external sealing seat adapted to seal the combustion chamber 106. The plug seat 208 is thermally connected to each of the shell 202 and the cylinder head 104. The plug seat 208 can be disposed between an annular extension 203 of the shell 202 and the cylinder head 104.

The plug seat 208 can engage each of the annular extension 203 and the cylinder head 104.

The pre-chamber spark plug 200 further includes an insulator 210 extending along the longitudinal axis LA and disposed at least partially within the shell 202. The insulator 210 includes an outer surface 212 (shown in FIG. 3) facing the inner surface 204 of the shell 202. The outer surface 212 of the insulator 210 can correspond to a radially outer surface of the insulator 210. The insulator 210 is seated in a passage of the shell 202. The insulator 210 can be made of a ceramic material, including any suitable spark plug insulator material. In some embodiments, the insulator 210 further includes a tapered portion 214 at an end 216 of the insulator 210 and disposed within the shell 202.

The pre-chamber spark plug 200 further includes a pre-chamber cap 218 connected to the shell 202. The pre-chamber cap 218 is connected to the shell 202, such that the pre-chamber cap 218 and the shell 202 together form a pre-chamber 220. In some cases, the pre-chamber cap 218 can be connected to an end of the shell 202 by a weldment. The tapered portion 214 of the insulator 210 faces the pre-chamber cap 218. Specifically, the pre-chamber 220 is disposed between the tapered portion 214 of the insulator 210 and the pre-chamber cap 218 with respect to the longitudinal axis LA.

Further, the pre-chamber cap 218 includes one or more openings 222 that permits gas exchange between the pre-chamber 220 and a space outside of the pre-chamber 220. Specifically, the one or more openings 222 enable fluid communication between the pre-chamber 220 and the combustion chamber 106. In particular, a fuel-air mixture can be introduced into the pre-chamber 220 from the combustion chamber 106 via the one or more openings 222, which can then be combusted in the pre-chamber 220. In some embodiments, the pre-chamber cap 218 includes two openings 222 that are disposed 180° apart. In other embodiments, the pre-chamber cap 218 includes four openings 222 that are disposed 90° apart. In other embodiments, the pre-chamber cap 218 includes six openings 222 that are disposed 60° apart, or eight openings 222 that are disposed 45° apart.

The pre-chamber spark plug 200 further includes a center electrode 224 extending from the insulator 210 into the pre-chamber 220. The center electrode 224 extends from the tapered portion 214 of the insulator 210. The center electrode 224 includes a center electrode body 226 and a center electrode tip 228, which is shaped as a cylindrical column in the illustrated embodiment. The center electrode body 226 can be made of Inconel™ 600 or other suitable center electrode material, and the center electrode tip 228 can be made of a nickel alloy, or a precious metal (e.g., platinum, iridium) or an alloy thereof. The center electrode body 226 is disposed within a central bore of the insulator 210, and projects from the insulator 210.

The pre-chamber spark plug 200 further includes at least one ground electrode 230 electrically coupled to the shell 202 and forming a spark gap 232 with the center electrode 224. Specifically, the spark gap 232 is formed between the at least one ground electrode 230 and the center electrode tip 228 of the center electrode 224. In some embodiments, the at least one ground electrode 230 can be connected to the shell by means of resistant welding. In some embodiments, the at least one ground electrode 230 can be connected to the shell by means of a laser beam directed transversely relative to the longitudinal axis LA. In the illustrated embodiment of FIGS. 2 to 4, the at least one ground electrode 230 includes two ground electrodes 230 in total. Each of the ground electrodes 230 forms the spark gap 232 with the center electrode 224. Each of the ground electrodes 230 extend transversely relative to the longitudinal axis LA. Each of the ground electrodes 230 can therefore extend radially relative to the longitudinal axis LA. The spark gap 232 is a radial spark gap that includes a gap portion between the center electrode tip 228 and the at least one ground electrode 230. An electric spark is generated in the spark gap 232 by which the combustion of the fuel-air mixture (received from the combustion chamber 106 via the one or more openings 222) takes place in the pre-chamber 220. The combustion can propagate from the spark gap 232 into the combustion chamber 106 via the one or more openings 222, such that a fuel-air mixture in the combustion chamber 106 is ignited.

In some embodiments, each of the ground electrodes 230 includes two parts, a supporting component 234 and a reinforcing component 236 (shown in FIG. 4). The reinforcing component 236 forms a burn-off surface of the spark gap 232. The reinforcing component 236 can be composed of a precious metal alloy, in particular a platinum and/or iridium alloy. The supporting component 234 can be composed of a nickel-based alloy or a noble metal. In some cases, the supporting component 234 can be composed of a nickel-based copper-cored component that is capable of electrically conducting a high voltage ignition pulse, as well as, thermally conducting heat away from the sparking surface. In some cases, the supporting component 234 can be composed of a solid nickel-based alloy for good heat flow and good corrosion resistance at running temperature. In some cases, each of the supporting component 234 and the reinforcing component 236 is embodied in the form of a circular cylinder and are made out of a wire.

Further, as shown in FIG. 2, the pre-chamber 220 defines a lower chamber C1 below the spark gap 232 towards the combustion chamber 106 and an upper chamber C2 above the spark gap 232.

The pre-chamber spark plug 200 further includes an internal seal 240 disposed between the inner surface 204 of the shell 202 and the outer surface 212 of the insulator 210. The internal seal 240 is spaced apart from the pre-chamber 220 with respect to the longitudinal axis LA. In some embodiments, the internal seal 240 is thermally coupled with the cylinder head 104 via the shell 202 and the plug seat 208. Thus, the internal seal 240 can exchange heat with a heat sink (i.e., the cylinder head 104) through the shell 202 and the plug seat 208.

The pre-chamber spark plug 200 further includes an annular reservoir 242 defined between the outer surface 212 of the insulator 210 and the inner surface 204 of the shell 202. The annular reservoir 242 is an internal annular space created between the outer surface 212 of the insulator 210 and the inner surface 204 of the shell 202. The annular reservoir 242 is spaced apart from the pre-chamber 220 with respect to the longitudinal axis LA.

Figure 5:
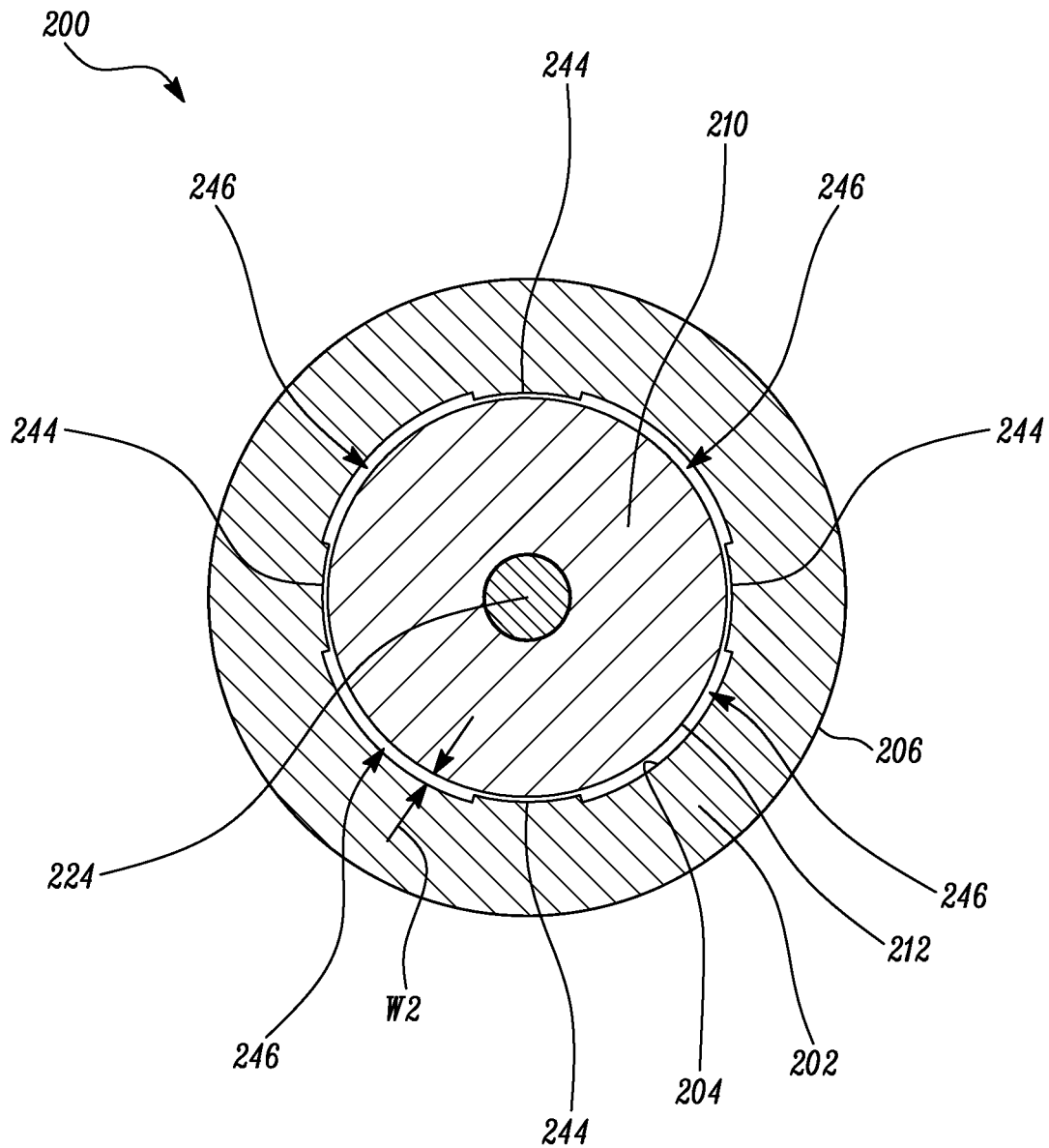
FIG. 5 is a cross-sectional view of the pre-chamber spark plug through section A-A' of FIG. 2, according to an embodiment of the present disclosure.
Figure 6:
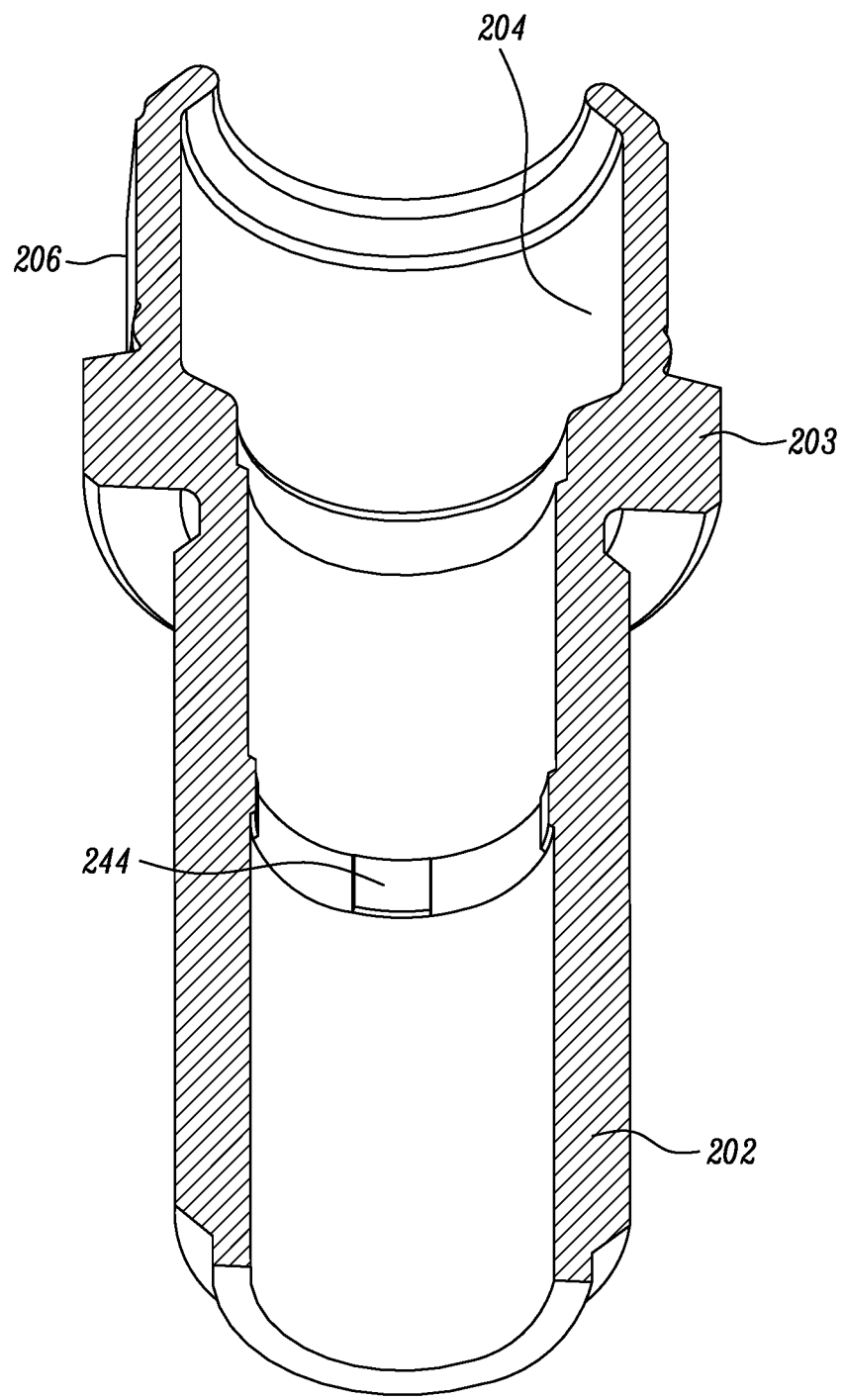
FIG. 6 is a cross-sectional perspective view of a shell of the pre-chamber spark plug of FIG. 2, according to an embodiment of the present disclosure.

FIG. 5 is a cross-sectional view of the pre-chamber spark plug 200 through section A-A' of FIG. 2, according to an embodiment of the present disclosure. FIG. 6 is a cross-sectional view of the shell 202 according to an embodiment of the present disclosure.

Referring to FIGS. 2 to 6, the pre-chamber spark plug 200 further includes a plurality of projections 244 angularly separated from each other relative to the longitudinal axis LA. Further, the plurality of projections 244 are disposed between the annular reservoir 242 and the pre-chamber 220 with respect to the longitudinal axis LA. In some embodiments, the tapered portion 214 of the insulator 210 is disposed between the plurality of projections 244 and the at least one ground electrode 230 with respect to the longitudinal axis LA.

In some embodiments, at least one projection 244 from the plurality of projections 244 is configured to at least partially engage with one of the outer surface 212 of the insulator 210 and the inner surface 204 of the shell 202. In some embodiments, each of the plurality of projections 244 at least partially engages with one of the outer surface 212 of the insulator 210 and the inner surface 204 of the shell 202. Due to at least partial engagement of the at least one projection 244 from the plurality of projections 244 with one of the outer surface 212 of the insulator 210 and the inner surface 204 of the shell 202, the insulator 210 is disposed at least partially and centrally within the shell 202. The plurality of projections 244 can therefore act as centering elements that limit lateral movement of the insulator 210 relative to the shell 202.

In some embodiments, each projection 244 is an annular segment extending radially between the inner surface 204 of the shell 202 and the outer surface 212 of the insulator 210. In some embodiments, each projection 244 is a component that is separate from each of the shell 202 and the insulator 210, and further inserted between the shell 202 and the insulator 210. Each projection 244 can be further attached to one of the shell 202 and the insulator 210. Specifically, each projection 244 can be further attached to one of the inner surface 204 of the shell 202 and the outer surface 212 of the insulator 210. In some embodiments, each projection 244 can be attached to one of the inner surface 204 of the shell 202 and the outer surface 212 of the insulator 210 by welding. In some embodiments, each projection 244 is a part of the inner surface 204 of the shell 202 or the outer surface 212 of the insulator 210. In other words, each projection 244 can be integral with one of the inner surface 204 of the shell 202 and the outer surface 212 of the insulator 210. In the illustrated embodiment of FIGS. 2 to 6, each projection 244 is a part of the inner surface 204 of the shell 202.

The plurality of projections 244 at least partially define a plurality of flow passages 246 therebetween. Specifically, each flow passage 246 is circumferentially defined between a corresponding pair of adjacent projections 244 from the plurality of projections 244. Each flow passage 246 extends at least partially parallel to the longitudinal axis LA. Further, each flow passage 246 is at least partially formed between the inner surface 204 of the shell 202 and the outer surface 212 of the insulator 210. Each flow passage 246 extends between the annular reservoir 242 and the pre-chamber 220, such that the annular reservoir 242 is in fluid communication with the pre-chamber 220. In some embodiments, each flow passage 246 extends from the pre-chamber 220 proximal to the tapered portion 214 of the insulator 210. Therefore, each flow passage 246 is in direct fluid communication with the upper chamber C2 of the pre-chamber 220. Further, each flow passage 246 is formed or defined by the projections 244, the inner surface 204 of the shell 202 and the outer surface 212 of the insulator 210.

In some embodiments, the plurality of projections 244 include a total of four projections 244 (shown in FIG. 5), such that the plurality of flow passages 246 include a total of four flow passages 246 (shown in FIG. 5). Each of the four flow passages 246 is circumferentially defined between a corresponding pair of adjacent projections 244 from the four projections 244. In some embodiments, each projection 244 is angularly spaced apart from an adjacent projection 244 relative to the longitudinal axis LA by 90 degrees. In some embodiments, the plurality of projections 244 can include a total of three projections 244, or more than four projections 244. In some embodiments, the plurality of projections 244 are equally spaced from each other. In other embodiments, the plurality of projections 244 are unequally spaced from each other.

The annular reservoir 242 is disposed between the internal seal 240 and the plurality of flow passages 246 with respect to the longitudinal axis LA. The internal seal 240 can prevent or significantly reduce leakage of fluid from the annular reservoir 242. It is to be noted the internal seal 240 is axially spaced apart from the tapered portion 214 of the insulator 210. Further, as the annular reservoir 242 is in fluid communication with the pre-chamber 220 via the plurality of flow passages 246 and the internal seal 240 is thermally coupled with the cylinder head 104, the internal seal 240 allows heat exchange between a gas disposed within the annular reservoir 242 and the cylinder head 104. In other words, the internal seal 240 allows the heat exchange between the cylinder head 104 and the gases present in the pre-chamber 220.

In some embodiments, the shell 202 is devoid of any openings between the inner surface 204 and the outer surface 206 of the shell 202, such that the shell 202 is configured to fluidly isolate the annular reservoir 242 and the plurality of flow passages 246 from the external environment. In other words, there is no passage between the inner surface 204 and the outer surface 206 of the shell 202 through which the annular reservoir 242 can fluidly connect with the external environment. The annular reservoir 242 can therefore fluidly communicate with only the pre-chamber 220 via the plurality of flow passages 246 and is otherwise sealed from the external environment.

During an operation of the internal combustion engine 100, hot residual gases are usually released from the combustion of the fuel-air mixture in the pre-chamber 220. In some cases, the residual gases from a previous ignition cycle can be trapped within the pre-chamber 220. In the disclosed pre-chamber spark plug 200, as the annular reservoir 242 is in fluid communication with the pre-chamber 220, the residual gases can flow out from the pre-chamber 220 into the annular reservoir 242 via the plurality of flow passages 246 at least partially formed by the plurality of projections 244. As the annular reservoir 242 is disposed between the internal seal 240 and the plurality of flow passages 246, and the internal seal 240 is thermally coupled with the cylinder head 104 via the shell 202 and the plug seat 208, the residual gases in the annular reservoir 242 can exchange the heat with the cylinder head 104. Therefore, due to heat exchange between the internal seal 240 and the cylinder head 104, a temperature of the hot residual gases can be reduced which can otherwise cause pre-ignition, engine misfire, and/or abnormal combustion in subsequent ignition cycles. In other words, the pre-chamber spark plug 200 including the annular reservoir 242, the internal seal 240, and the plurality of projections 244 defining the plurality of flow passages 246 can provide a thermal path to the residual gases to exchange the heat with the shell 202 and eventually with a heat sink (i.e., the cylinder head 104). In this way, a fuel-air mixture of subsequent ignition cycles can be prevented from pre-ignition and self-ignition in the pre-chamber 220.

Moreover, an axial distance between the internal seal 240 and the plug seat 208 is relatively less than an axial distance between an internal seal and a plug seat in conventional pre-chamber spark plugs. The internal seal 240 is disposed in a larger diameter portion of the shell 202 in the present disclosure and the internal seal in the conventional pre-chamber spark plugs is usually disposed in a threaded portion of a shell. By providing the internal seal 240 in the larger diameter portion of the shell 202, a surface area of the internal seal 240 is relatively increased. In this way, the internal seal 240 has a larger surface contact area with the shell 202. Further, a temperature of the shell 202 in the larger diameter portion is less than a temperature of the shell 202 in the threaded portion. Thus, as the internal seal 240 is disposed in the larger diameter portion of the shell 202, a greater amount of heat can be exchanged with the shell 202 and eventually with the heat sink. This can also maintain a desirable temperature of the center electrode tip 228. Such a position of the internal seal 240 can enable a high-power engine to run with an acceptable center electrode temperature and an efficient heat flow path.

As the insulator 210 is disposed at least partially and centrally within the shell 202, the residual gases can flow through the plurality of flow passages 246 in a uniform manner. This can therefore maintain a continuous and balanced fluid communication between the pre-chamber 220 and the annular reservoir 242. In other words, the plurality of projections 244 can provide an efficient and consistent flow path (through the plurality of flow passages 246) for the gases between the pre-chamber 220 and the annular reservoir 242.

The inclusion of the annular reservoir 242, the internal seal 240, and the plurality of projections 244 at least partially defining the plurality of flow passages 246 in the pre-chamber spark plug 200 can prevent an uncontrolled ignition in the combustion chamber 106 prior to an ignition point. Thus, a reduction in the temperature of the residual gases can prevent a risk of damaging the internal combustion engine 100.

The pre-chamber spark plug 200 can provide an efficient heat transfer from the pre-chamber 220 to the cylinder head 104 through the internal seal 240 and the plug seat 208, as compared to a heat transfer between a pre-chamber and a sink through various insulator components in the conventional pre-chamber spark plugs. In other words, the pre-chamber spark plug 200 can provide an efficient heat path which transfers a relatively less heat from the pre-chamber 220 to the heat sink (i.e., the cylinder head 104). A relatively less heat transfer from the pre-chamber 220 to the cylinder head 104 can increase a total thermal efficiency of the pre-chamber spark plug 200 and the combustion chamber 106. Therefore, the disclosed pre-chamber spark plug 200 can provide more energy to the combustion chamber 106 to convert it to useful mechanical work and less heat energy is lost to a cooling system. This can further improve a fuel economy of the internal combustion engine 100 including the pre-chamber spark plug 200.

When the residual gases are trapped in the pre-chamber 220 from the previous ignition cycle, the residual gases can flow out into the annular reservoir 242 via the plurality of flow passages 246 at least partially defined by the plurality of projections 244. The flow of the residual gases from the pre-chamber 220 to the annular reservoir 242 via the plurality of flow passages 246 can allow a fresh charge of the fuel-air mixture into the pre-chamber 220 and the spark gap area at the required time of next ignition cycle. The ingestion of the fresh charge of the fuel-air mixture can prevent engine misfire and poor combustion performance which was otherwise noticed in the conventional pre-chamber spark plugs having trapped residual gases in their pre-chambers.

The inclusion of the plurality of flow passages 246 and the annular reservoir 242 can provide an additional space to an upper chamber volume (volume defined by the upper chamber C2 shown in FIG. 2) of the pre-chamber 220. In other words, the pre-chamber spark plug 200 including the plurality of flow passages 246 and the annular reservoir 242 has an increased upper chamber volume as compared to the conventional pre-chamber spark plugs. Due to the increased upper chamber volume, the pre-chamber spark plug 200 has a relatively reduced ratio of a lower chamber volume (volume defined by the lower chamber C1 shown in FIG. 2) to the upper chamber volume. The reduced ratio of the lower chamber volume to the upper chamber volume can result in an improved movement of the fresh charge into the spark gap area within the pre-chamber 220. Further, the reduced ratio of the lower chamber volume to the upper chamber volume can prevent poor combustion in the pre-chamber 220 and optimize a wide range performance of the internal combustion engine 100.

The ratio of the lower chamber volume to the upper chamber volume can be chosen and adjusted as per desirable application attributes. Therefore, for the pre-chamber 220 having the increased upper chamber volume, there can be no requirement to follow conventional methods of increasing the upper chamber volume by installing an external secondary pre-chamber insert or a completely separate secondary spark plug within the combustion chamber 106. Hence, even with an improved combustion performance, the pre-chamber spark plug 200 including the annular reservoir 242 and the plurality of flow passages 246 can reduce an overall manufacturing cost and complexity of the internal combustion engine 100 as compared to the conventional pre-chamber spark plugs. Further, the pre-chamber spark plug 200 does not create any space constraint as the upper chamber volume is increased due to presence of the plurality of flow passages 246 and the annular reservoir 242 within the shell 202.

Therefore, the pre-chamber spark plug 200 can enable increase of the upper chamber volume without requiring any external inserts or components as the annular reservoir 242 and the plurality of passages 246 are fully disposed within the pre-chamber spark plug 200. The pre-chamber spark plug 200 can therefore have a compact design while providing improved combustion performance. Further, no additional passages are required within the shell 202 for fluidly communicating the pre-chamber 220 with any external chambers, thereby preserving a structural integrity of the shell 202 and preventing any additional leakage of fluid through the shell 202. Moreover, any additional component (for example, one or more valves) may not be required to regulate flow between the pre-chamber 220 and any external chambers.

Moreover, as the pre-chamber spark plug 200 does not require any secondary pre-chamber insert to increase the upper chamber volume, a maximum area of the pre-chamber spark plug 200 can be available to obtain an increased dielectric strength of the insulator 210. In other words, the maximum area of the pre-chamber spark plug 200 can be optimized to provide required shell strength and maximizing insulator dielectric strength.

With reference to FIGS. 4 and 5, an axial length of each flow passage 246 is substantially equal to an axial length of each projection 244. Further, the annular reservoir 242 has a maximum reservoir width W1 (shown in FIG. 4) perpendicular to the longitudinal axis LA. The maximum reservoir width W1 can correspond to a maximum radial width of the annular reservoir 242. Each flow passage 246 has a maximum passage width W2 (shown in FIG. 5) between the inner surface 204 of the shell 202 and the outer surface 212 of the insulator 210. In some embodiments, the maximum reservoir width W1 of the annular reservoir 242 perpendicular to the longitudinal axis LA is greater than the maximum passage width W2 of each flow passage 246. In some embodiments, the maximum reservoir width W1 is greater than the maximum passage width W2 by a factor of at least two. In some embodiments, a total reservoir volume of the annular reservoir 242 is greater than a total volume of the plurality of flow passages 246. In some embodiments, a total reservoir volume of the annular reservoir 242 is greater than a total volume of the plurality of flow passages 246 by a factor of at least 2, 3, or 5.

Figure 7:
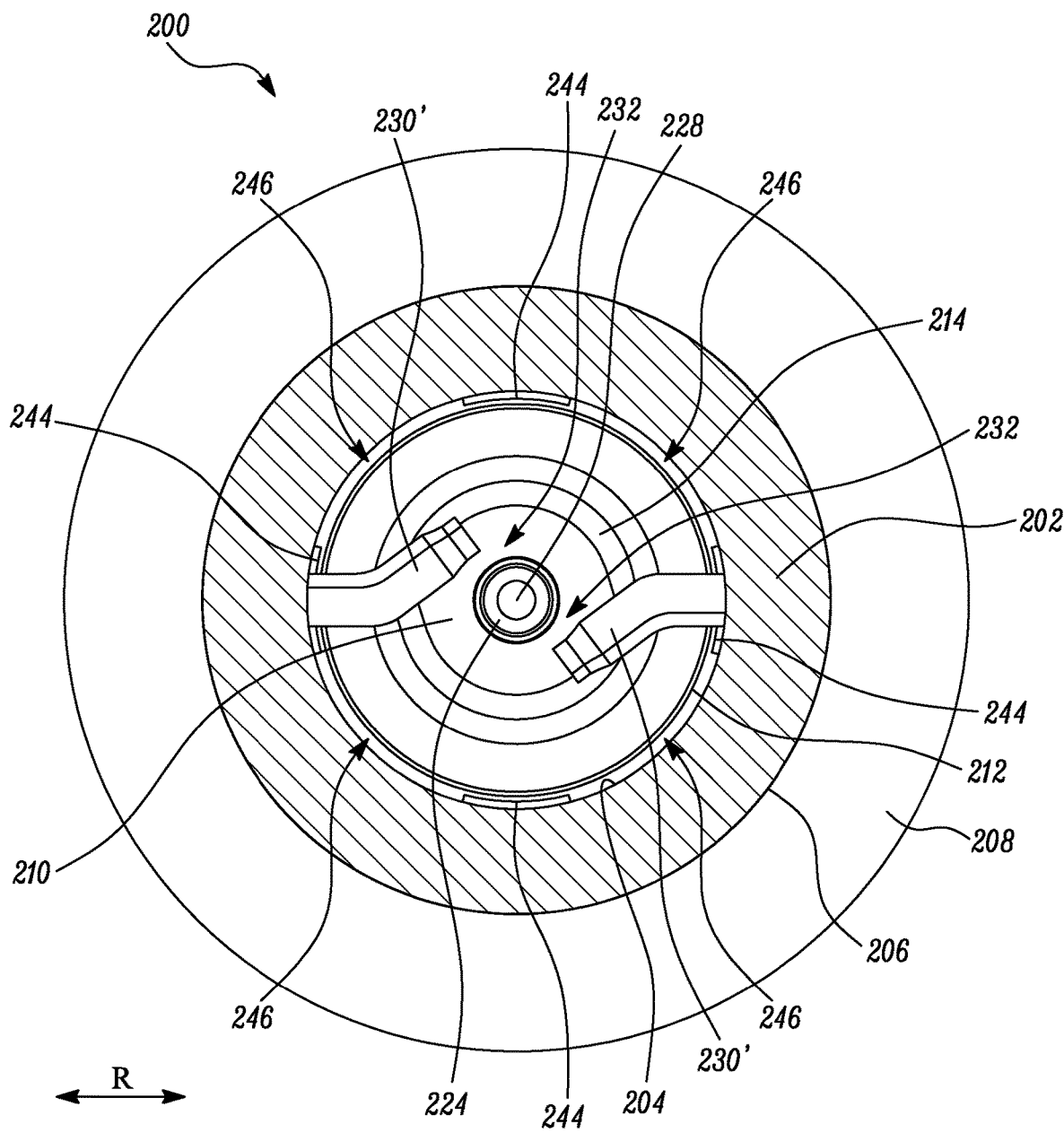
FIG. 7 is a cross-sectional view of the pre-chamber spark plug through section B-B' of FIG. 2, according to another embodiment of the present disclosure.

FIG. 7 is a cross-sectional view of the pre-chamber spark plug 200 through section B-B' of FIG. 2, according to another embodiment of the present disclosure. In the illustrated embodiment of FIG. 7, the pre-chamber spark plug 200 includes at least one ground electrode 230' (instead of the at least one ground electrode 230). The at least one ground electrode 230' includes two ground electrodes 230' in total that are bent in such a way that each of the two ground electrodes 230' form the spark gap 232 with the center electrode 224. The two ground electrodes 230' are in electrical contact with the shell 202. In some embodiments, the at least one ground electrode 230' is inclined to a radial direction "R" defined relative to the longitudinal axis LA. As shown in FIG. 7, each of the two ground electrodes 230' is inclined to the radial direction "R" defined relative to the longitudinal axis LA.

While aspects of the present disclosure have been particularly shown and described with reference to the embodiments above, it will be understood by those skilled in the art that various additional embodiments can be contemplated by the modification of the disclosed machines, systems and methods without departing from the spirit and scope of what is disclosed. Such embodiments should be understood to fall within the scope of the present disclosure as determined based upon the claims and any equivalents thereof

What is claimed is:
1. A pre-chamber spark plug, comprising:
a shell extending along a longitudinal axis, the shell comprising an inner surface;
an insulator comprising an outer surface and disposed at least partially within the shell, such that the outer surface of the insulator faces the inner surface of the shell;
a pre-chamber cap connected to the shell, the pre-chamber cap and the shell together forming a pre-chamber, the pre-chamber cap comprising one or more openings that permits gas exchange between the pre-chamber and a space outside of the pre-chamber;
an annular reservoir defined between the outer surface of the insulator and the inner surface of the shell, wherein the annular reservoir is spaced apart from the pre-chamber with respect to the longitudinal axis; and
a plurality of projections angularly separated from each other relative to the longitudinal axis, wherein the plurality of projections are disposed between the annular reservoir and the pre-chamber with respect to the longitudinal axis and at least partially define a plurality of flow passages therebetween, wherein each flow passage extends at least partially parallel to the longitudinal axis, and wherein each flow passage fluidly extends between the annular reservoir and the pre-chamber, such that the annular reservoir is in fluid communication with the pre-chamber.

2. The pre-chamber spark plug of claim 1, further comprising an internal seal disposed between the inner surface of the shell and the outer surface of the insulator, and wherein the annular reservoir is disposed between the internal seal and the plurality of flow passages with respect to the longitudinal axis.

3. The pre-chamber spark plug of claim 2, wherein the internal seal is thermally coupled with a cylinder head via the shell, such that the internal seal allows heat exchange between a gas disposed within the annular reservoir and the cylinder head.

4. The pre-chamber spark plug of claim 1, wherein at least one projection from the plurality of projections is configured to at least partially engage with one of the outer surface of the insulator and the inner surface of the shell, such that the insulator is disposed at least partially and centrally within the shell.

5. The pre-chamber spark plug of claim 4, wherein the plurality of projections comprise a total of four projections, such that the plurality of flow passages comprise a total of four flow passages, and wherein each of the four flow passages is defined between corresponding pair of adjacent projections from the four projections.

6. The pre-chamber spark plug of claim 1, wherein each projection is an annular segment extending radially between the inner surface of the shell and the outer surface of the insulator.

7. The pre-chamber spark plug of claim 1, wherein each projection is a part of the inner surface of the shell or the outer surface of the insulator.

8. The pre-chamber spark plug of claim 1, wherein a maximum reservoir width of the annular reservoir perpendicular to the longitudinal axis is greater than a maximum passage width of each flow passage between the inner surface of the shell and the outer surface of the insulator.

9. The pre-chamber spark plug of claim 8, wherein the maximum reservoir width is greater than the maximum passage width by a factor of at least two.

10. The pre-chamber spark plug of claim 1, wherein a total reservoir volume of the annular reservoir is greater than a total volume of the plurality of flow passages.

11. The pre-chamber spark plug of claim 1, wherein the shell further comprises an outer surface facing an external environment of the pre-chamber spark plug, wherein the shell is devoid of any openings between the inner surface and the outer surface of the shell, such that the shell is configured to fluidly isolate the annular reservoir and the plurality of flow passages from the external environment.

12. The pre-chamber spark plug of claim 1, further comprising:
    a center electrode extending from the insulator into the pre-chamber; and
    at least one ground electrode electrically coupled to the shell and forming a spark gap with the center electrode.

13. The pre-chamber spark plug of claim 12, wherein the at least one ground electrode is inclined to a radial direction defined relative to the longitudinal axis.

14. The pre-chamber spark plug of claim 12, wherein the insulator further comprises a tapered portion at an end of the insulator and disposed within the shell, wherein the tapered portion faces the pre-chamber cap, such that the pre-chamber is disposed between the tapered portion and the pre-chamber cap with respect to the longitudinal axis, and wherein the center electrode extends from the tapered portion.

15. The pre-chamber spark plug of claim 14, wherein each flow passage extends from the pre-chamber proximal to the tapered portion.

16. The pre-chamber spark plug of claim 14, wherein the tapered portion is disposed between the plurality of projections and the at least one ground electrode with respect to the longitudinal axis.

* * * * *